COLOR TV DECODING

Filed Sept. 21, 1965 3 Sheets-Sheet 1

INVENTOR.
Nathan Gold
BY Brown and Mikulka
and
James E. Mrose
ATTORNEYS

COLOR TV DECODING

Filed Sept. 21, 1965 3 Sheets-Sheet 2

INVENTOR.
Nathan Gold
BY Brown and Mikulka
and
James E. Mrose
ATTORNEYS

COLOR TV DECODING

Filed Sept. 21, 1965 3 Sheets-Sheet 3

INVENTOR.
Nathan Gold
BY Brown and Mikulka
and
James E. Mrose
ATTORNEYS

United States Patent Office 3,485,943

Patented Dec. 23, 1969

3,485,943

COLOR TV DECODING

Nathan Gold, Brookline, Mass., assignor to Polaroid Corporation, Cambridge, Mass., a corporation of Delaware Filed Sept. 21, 1965, Ser. No. 488,925
Int. Cl. H04n *5/38, 5/44;* H03d *3/18*
U.S. Cl. 178—5.4 40 Claims

ABSTRACT OF THE DISCLOSURE

The present disclosure relates to improvements in decoding of color information expressed by color-television signals, and, in one particular aspect, to novel and improved untuned electrical circuitry of uncomplicated and inexpensive form which uniquely demodulates composite video signals in a color television receiver to produce color-related signals which characterize desired levels of color saturation, contrast, and brightness, and which lend themselves, to application to picture tubes either separately or in combination.

Figure 1:
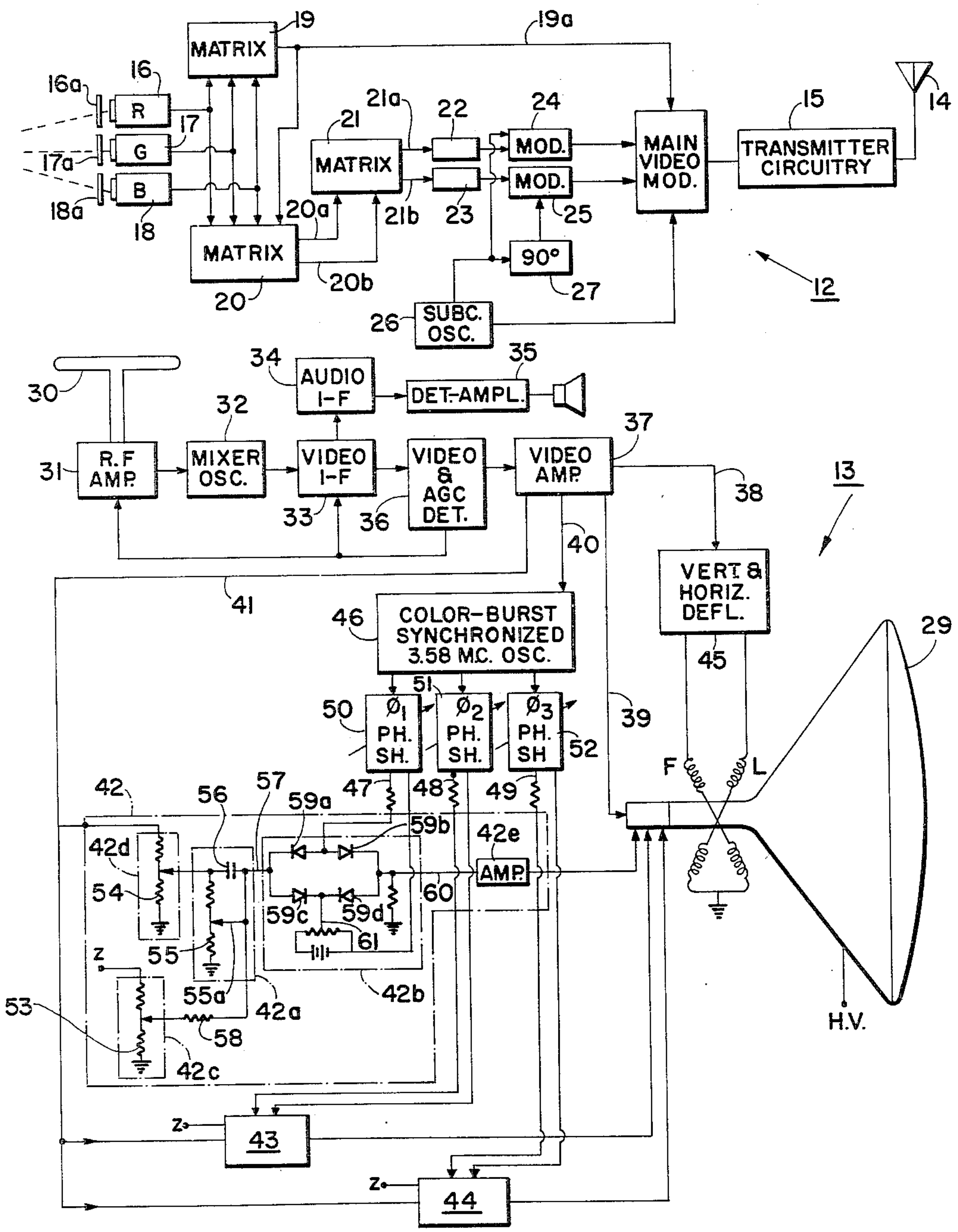

In a now-conventional technique for the electronic transmission and reproduction of color information for television purposes, NTSC color video signals are developed from the output signals of three optically-registered camera tubes each producing electrical outputs responsive to distinctively-filtered views of a televised scene, these synchronous output signals being matrixed to produce a luminance-characterizing signal for amplitude modulation of the video carrier, as well as two chrominance-characterizing signals for amplitude modulation of the usual 3.58 mc. subcarriers which are in quadrature phase relationship with one another. The resulting composite video signal involves a 3.58 mc. waveform the phases of which are dependent upon the relative amplitudes of the two chrominance-characterizing signals and thus define the colors in the scene. At each remote receiving site, electrical waveforms corresponding to the original luminance and both original chrominance signals are developed from the composite transmissions, and, commonly, these waveforms excite materix circuitry into resolution of three related electrical signals each instantaneously representative of a different one of the red-, blue-, and green-color contents of the televised subject; the latter signals are separately applied to different grids associated with the usual three-gun picture tube, for example. In color television receivers, four cardinal qualities of the reproduction must be regulated accurately to achieve optimum performance; these are the qualities of hue (or distinction simply in terms of visible wavelengths, i.e. color), saturation (or contribution of each color in relation to others which may be present at the same time), brightness (or quantity of light produced), and contrast (or ratio of illumination between the lightest and darkest reproductions). In general, the special circuitry which has been devised in attempts to accomplish these regulations tends to be complex in design, construction and adjustment, and, further, lacks stability where tuned units are involved in determining critical phase relationships. Moreover, the established properties of NTSC video signals are such that three errors in color reproduction are inherently promoted in certain systems; one of these results from the fact that the three primary-color vectors from the subcarrier are not exactly 120° apart, and can manifest itself in discrepancies in hue; another of these stems from inequalities in the amplitudes of the three primary-color vectors, with consequent propensities toward degradation of color saturation characteristics; and yet another of these results from inequalities of the primary-color contributions to the luminance signal, such that the displays may exhibit incorrect luminance qualities. Interdependencies in the usual three receiver color channels also complicates the making of color-picture adjustments. In accordance with the present teachings, however, such problems associated with conventional receiver matrixing practices are avoided through color-decoding which is based upon plural independent gatings of the composite video signal at periodicities corresponding to the periodicity of the 3.58 mc. (approximately) subcarrier frequency, and in conjunction with simple, low-cost and stable untuned circuitry which readily affords isolated precision adjustments of saturation, hue, contrast and brightness for each of the plural color channels. Any known form of color display tube, such as the three-gun shadow-mask or so-called "Chromatron" single-gun types of tubes, for example, may be excited by the closely-regulated demodulator output signals, either in continuous-wave or pulse forms. One highly advantageous aspect of the improved color-TV demodulator is found in the provision of individual color-saturation adjustments via elementary R-C units which selectably alter the amplitudes of the subcarrier-frequency components of the composite video signal in relation to the amplitudes of the relatively low luminance-frequency components.

Accordingly, it is one of the objects of the present invention to provide unique improvements in decoding of composite video signals for efficient reproduction of color television images wherein the qualities of saturation, hue, brightness and contrast are subject to precise independent regulation via each color channel.

Another object is to provide novel untuned color-television demodulation networks in which inexpensive and readily-adjustable components associated with gating circuitry promote precision control of one or more of the qualities of saturation, hue, brightness and contrast for each of the plural decoded color signals.

A further object is to provide new and advantageous networks for the processing of composite video signals in which simple R-C peaking circuits cooperate with subcarrier-frequency gates to express accurate and isolated regulations of hue and saturation characteristics in color-demodulated signals.

Still further, it is an object to provide unique and improved decoding networks, for color television receivers, which advantageously lend themselves to use with picture tubes requiring excitations by either continuous-wave or periodically-sampled color signals, and which are of relatively inexpensive construction offering unusual versatility and convenience in precision adjustment of color-signal qualities.

By way of a summary account of practice of this invention in one of its aspects, a conventional composite video signal expressing the modulations which characterize both luminance and chrominance information in a color-television transmission is derived from the video-frequency stages of a receiver and is applied as the input to three like decoding networks. Each of these networks includes an adjustable resistance-capacitance peaking circuit which alters the relationship of the amplitude of the high-frequency (3.58 mc. subcarrier frequency) chrominance-signal component to the amplitude of the relatively low-frequency luminance-signal component, and may, in addition, include elements for independently adjusting the low-frequency gain and the D.C. biasing level of the resulting signal supplied to a gate. The three electronic gates are each switched on for but a predetermined relatively small different portion of each cycle of a subcarrier-frequency gating signal which is phase-locked in relation to the usual color-burst signals transmitted along with the video, audio and synchronizing information. Gating in the three networks is preferably set to occur during different intervals which are phase-displaced 120 degrees in relation to the cycling of the color-burst subcarrier frequency (3.58 mc.). The resulting time-displaced trains of pulses from the gates characterize the red, blue and green color signals and may be applied directly to the grid or grids of certain dot-sequential type picture tubes, or, after individual low-pass filtering, to the grids of a conventional three-gun shadow-mask type picture tube.

Figure 2:
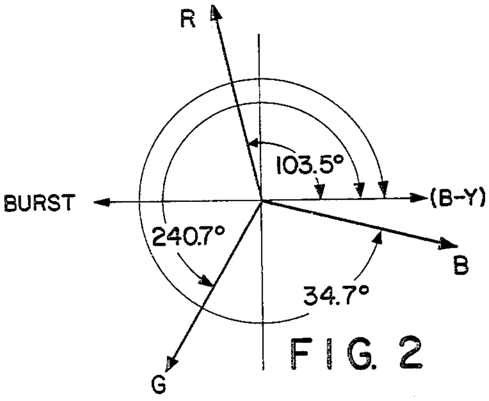
Figure 3A:
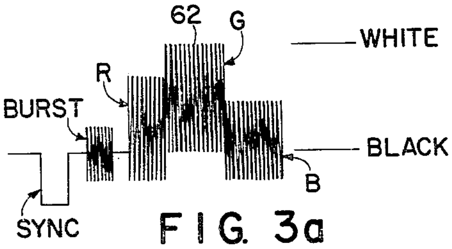
Figure 3B:
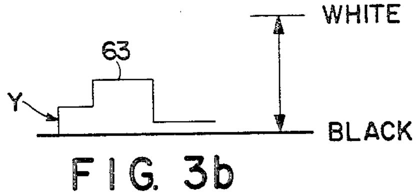
Figure 5:
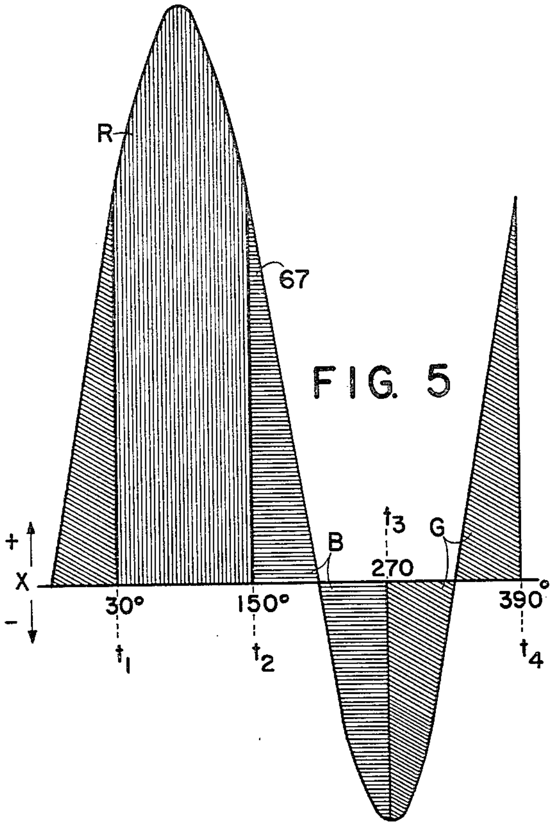
Figure 4:
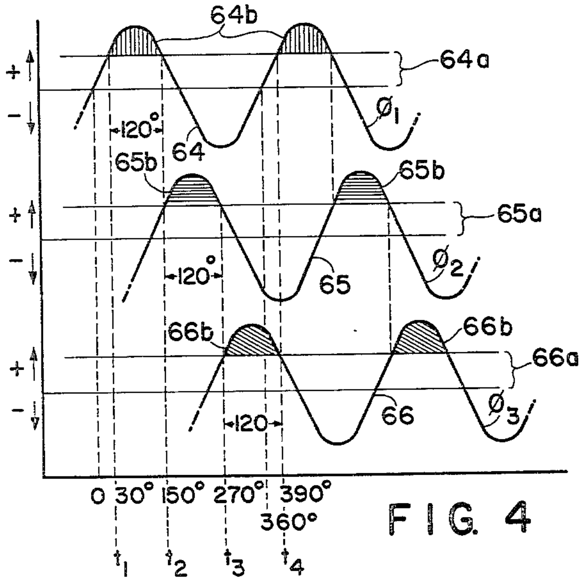
Figure 6:
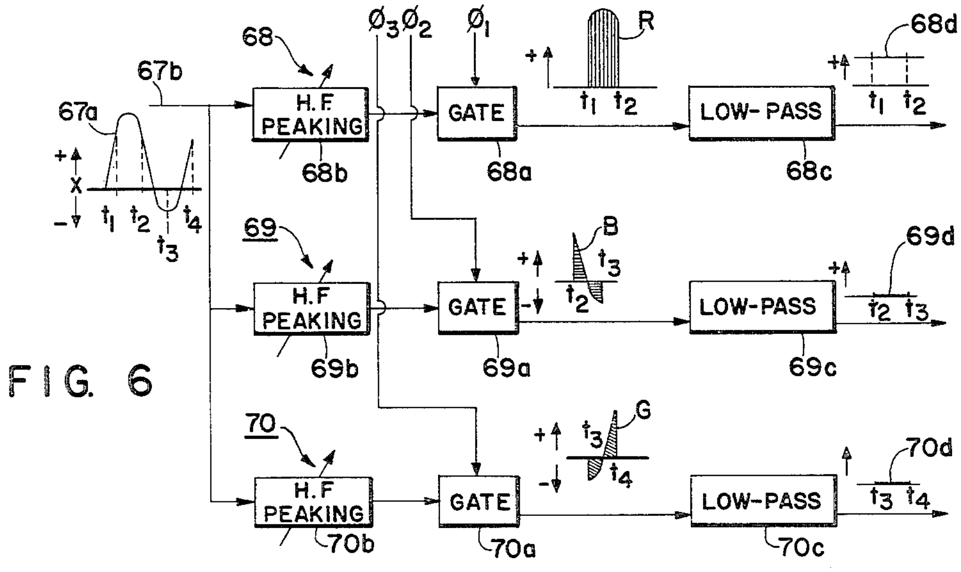
Figure 7:
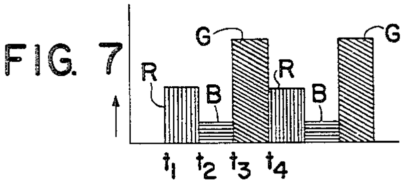
Figure 8:
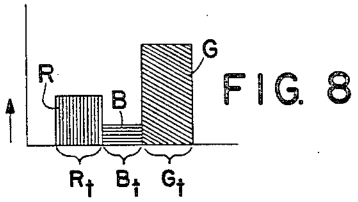
Figure 9:
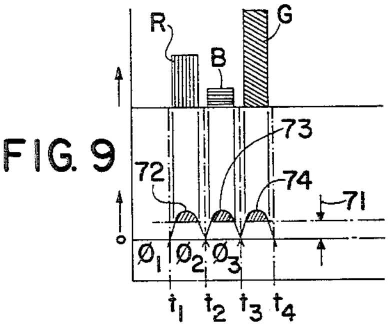
Figure 10:
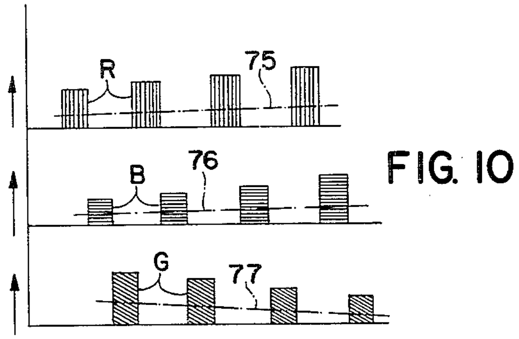
Figure 11:
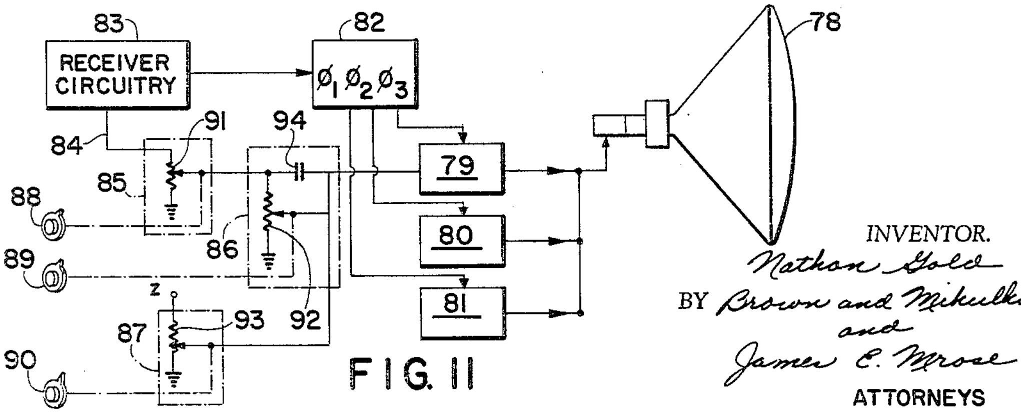

Although the aspects and features of this invention which are believed to be novel are expressed in the appended claims, additional details as to preferred practices and embodiments, and as to the further advantages, objects an features thereof, may be most readily comprehended through reference to the following description taken in connection with the accompanying drawings, wherein:

FIGURE 1 represents principal elements of a color television system embodying certain of the present teachings, in part in block-diagram and in part in schematic forms;

FIGURE 2 comprises a phase diagram of color signal components expressed by subcarrier modulations in a color television transmission;

FIGURE 3A illustrates portions of a composite video signal;

FIGURE 3B graphically characterizes the corresponding luminance values for the signals of FIGURE 3A;

FIGURE 4 depicts time-coordinated waveforms which are effective in gating units of the FIGURE 1 system;

FIGURE 5 portrays a fragment of a composite video signal which characterizes substantially one primary color, the gated portions thereof being distinctively cross-hatched to suggest the hues involved;

FIGURE 6 is a block diagram of an improved color-decoding network, together with miniature waveforms of the signals appearing at various stages thereof;

FIGURE 7 graphically represents sequential pulse outputs obtainable from the improved color-decoding network;

FIGURE 8 graphically portrays unequal pulse-width outputs obtainable from the same decoding network;

FIGURE 9 graphically illustrates discontinuous pulse outputs obtainable from the improved decoder;

FIGURE 10 displays typical pulse outputs from each of three gating channels of the color decoder; and FIGURE 11 is a partly schematic and partly block-diagrammed representation of a portion of a color television receiver incorporating an operator-controlled network for adjustments of brightness, saturation and contrast independently of factory settings of color qualities in the improved decoder channels.

The color television arrangement portrayed in FIGURE 1 includes transmitter and receiver apparatus, 12 and 13, respectively, which are in communication by way of electromagnetic radiations within a prescribed VHF channel. Transmitting antenna 14 is excited by transmitter circuitry 15 of conventional type which delivers a modulated output containing the usual five requisite components (sound, deflection sync., luminance, chrominance, and chrominance sync.) for the radiated color signals, the luminance and chrominance aspects of the televised scene being characterized in a camera assembly which includes the customary three pickup tubes 16–18, such as image orthicon tubes, which are optically excited via filters **16*a*–18*a* to resolve the televised scene into three synchronous electrical output signals (the usual $E_R$, $E_G$ and $E_B$) related respectively to its red (R), green (G) and blue (B) color contents. The three camera output signals are each fed to both of two matrices, 19 and 20, the first of which produces a luminance-characterizing signal (the usual $E_Y$) in the coupling 19*a*, and the second of which produces chrominance-characterizing signals in couplings 20*a* and 20*b* (the usual $E_R-E_Y$ and $E_B-E_Y$ signals). The latter are processed into the usual I and Q signals in output couplings 21*a* and 21*b*, respectively, of matrix 21 and are passed through low pass filters 22 (1.5 mc.) and 23 (0.5 mc.) before being applied to balanced modulators 24 and 25, respectively, which also receive phase-displaced inputs from a 3.58 mc. subcarrier oscillator 26 cooperating with a quadrature phase shifter 27. Suppressed-subcarrier outputs from the balanced modulators, and the luminance and 3.58 mc. color burst sync. signals, are combined as modulations of the main carrier via video modulator 28**, providing the desired composite video output signal including a color burst signal, a luminance or Y signal, and, superimposed upon the Y signal, an important 3.58 mc. signal having instantaneous phase values representative of hue and amplitudes representative of color saturation of the corresponding incremental areas of the televised scene.

At one or more remote locations, such as that of the illustrated receiver 13, the information coded into the transmitted signals must be resolved and translated into forms appropriate for excitations of a picture tube 29. Color television picture tubes may be of various types, such as the popular triple-gun shadow-mask tube having clusters of three phosphor dots each capable of emitting light of a different color, or the so-called Chromatron or Lawrence single-gun tube which employs repetitive tricolor arrays of phosphor strips scanned by a grid-indexed electron beam, or the velocity-modulated type tubes having one or more guns and striped or layered phosphor screens. Techniques and circuitry for energizing such picture tubes are well known in the art, and, in the cases of excitations specifically responsible for the needed color control on simultaneous, dot-, line-, or field-sequential bases, the color processing circuitry may be obligated to function in diverse and unique ways to meet the needs of the associated picture tubes. However, as is clarified later herein, color-decoding circuitry embodying teachings of the present invention advantageously lends itself to uses involving widely-different requirements. In the receiver shown in FIGURE 1, the audio, synchronization, high-voltage, and principal video circuits, may be conventional, but are depicted and discussed to emphasize the compatibility and certain interrelationships with the color-decoding improvements. VHF signals intercepted by antenna 30 are applied to an R.F. tuner 31 which in turn feeds a mixer oscillator 32 coupled with a video I.F. stage 33, the latter serving to excite an audio I.F. amplifier 34 associated with the usual detector-amplifier circuitry 35 and, also, to excite the video detector stage 36. Demodulated composite video signals advance through video amplification circuitry 37, from which are derived deflection-synchronizing signals (in coupling 38), luminance signals (in coupling 39), color-burst synchronizing signals (in coupling 40), and composite video signals (in coupling 41). The latter signals are applied to each of three like decoder channel circuits 42–44, while the deflection-synchronizing signals excite the vertical and horizontal deflection circuitry 45, and the discontinuous color-burst signals synchronize the generation of a continuous 3.58 (approx.) mc. signal by the subcarrier oscillator 46. Known forms of synchronized subcarrier oscillator circuits may be used, such as one in which a reactance tube preserves the phase of a 3.58 mc. oscillator in a desired relation to that of the color burst signal, or a shock-excited crystal oscillator. For purposes of practicing the present invention, more than one (specifically, three, in the illustrated system) reference phase of subcarrier oscillator outputs is employed in certain gating networks, and, hence, the three phases $\phi_1-\phi_3$ of gating signals in couplings 47–49 are developed by the phase-shift circuits 50–52, respectively. In one elementary form, these phase shift circuits merely include inductance-capacitance combinations exploiting common design concepts to produce from the oscillator output the phasings $\phi_1$, $\phi_2$ and $\phi_3$. One of these phases, such as $\phi_1$, may be that of the subcarrier oscillator output, if it is appropriate, in which event the phase shift circuit 47 is not required. The substantially sinusoidal gating signals are of predetermined phasings relative to one another, and to the reference color burst signals; by way of example, they may be substantially 120° apart for certain purposes, or they may have substantially the same phase displacements (not strictly 120° apart) as the red-, green, and blue-characterizing vector components of the 3.58 mc. portion of the composite video signal.

Each of the three decoder channel circuits 42–44 is thus excited both by the composite video appearing in coupling 41 and by a different one of the gating signals (of phases $\phi_1$, $\phi_2$ and $\phi_3$, respectively) from couplings 47–49. Circuit 42, which is representative also of like circuits 43 and 44, includes a color saturation control network in the simple form of an adjustable R–C unit 42*a*, a gating unit preferably in the illustrated form of a semiconductor diode gate unit 42*b*, a brightness control unit 42*c* in the form of a tapped resistance 53, and a contrast control unit 42*d* in the form of a tapped resistance 54. When required, the circuit may further include an output amplifier 42*e*. Composite video signals applied to the circuit 42 develop a drop across contrast control resistance 54, such that both the relatively low-frequency luminance component and relatively high-frequency (3.58 mc) component thereof as seen by the remainder of the circuit are regulatable by settings of the output tap for that resistance. The tapped output signal is then applied across tapped resistance 55 of saturation control network 42*a* and through the low-capacitance capacitor 56, the tapped and passed outputs of both being applied in turn as input to the gating unit 42*b* via the coupling 57. Network 42*a* thus functions as a form of high-frequency peaking circuit, in that the high frequency (3.58 mc.) components are passed with little attenuation while the amplitudes of the lower-frequency (luminance) components are attenuated by amounts depending upon the positions of tap 55*a*. Desired regulation of the amplitude of the 3.58 mc. component relative to the low-frequency component is thus effected simply by setting the location of tap 55*a*. Coupling 57 also witnesses a D.C. biasing which is introduced through high resistance 58 by settings of a tap or resistance 53, the latter being connected across a grounded D.C. source via the positive source terminal Z. Four terminal gating unit 42*b* includes four semiconductor diode legs 59*a*–59*d*, polarized as shown, such that a low-resistance conductive path is established from the input coupling 57 to the diagonally-opposite output coupling 60 only when the voltage appearing in gating control coupling 47 exceeds that of a reference of the same polarity appearing at the diagonally-opposite gating control coupling 61. For the latter purposes, the reference voltage is conveniently D.C., and is shown to be tapped from a resistance exhibiting a voltage drop occasioned by a D.C. source (schematically, a battery). Amplifier 42*e* delivers the gating unit output to a control element of picture tube 29. A three-gun type tricolor tube (such as a conventional shadow-mask tube) is schematically shown to have its gun grids individually energized by the outputs from different ones of the channels 42–44, and, for such an application, these channels then usefully have the 3.58 mc. ripple contents of their outputs removed by low-pass filtering, which may conveniently be incorporated in known ways into the characteristics of the amplifiers such as amplifier 42*e*.

Operation of the improved color-decoding array may be readily understood by having in mind that the usual transmitted composite video signals include modulations which express the aforementioned luminance information and, superimposed thereon, the aforementioned 3.58 mc. signal, the instantaneous phases and amplitudes of the latter (chrominance signal) characterizing, respectively, the dominant wavelength of the color to be reproduced, and the saturation of that color. In FIGURE 2, typical vectors representing the red (R), green (G), and blue (B) primary-color components for such chrominance signals are displayed in characteristic phase relationships with the color burst and having illustrated amplitudes which are in the correct proportions for optimum color reproduction of the saturated primaries. FIGURES 3A and 3B illustrate, respectively a portion of a composite video signal 62 having successive saturated red, green, and blue transmissions, and the corresponding luminance component 63 thereof, the black and white reference signal levels being set forth in both instances. As is well known in the art, correct color reproduction obtains only if the relative gains of the chrominance and luminance components are as prescribed. In accordance with the present teachings, the desired relationships are readily and positively attainable and maintainable through the adjustments and settings of the parameters in control circuits such as circuits 42–44 in FIGURE 1; such settings are intended to be made during manufacture, and may in practice involve screw-driver variables or fixed-parameter elements selected for particular installations. The nature and extents of these settings are best considered in relation to the gating operations, and, therefore, it is helpful to first refer to the explanatory illustrations for the gating. In FIGURE 4, for example, the three time-coordinated sinusoidal signals 64–66 represent the 3.58 mc. phase-displaced outputs applied to gating unit control couplings 47–49 respectively, from the phase-shift circuits 50–52 associated with the color-burst synchronized oscillator 46 in FIGURE 1. Signal levels 64*a*–66*a* represent the D.C. voltages simultaneously applied to the diagonally-opposite couplings (such as coupling 61) of the three gating units (such as unit 42*b*). The cross-hatched portions 64*b*–66*b* (involving the standard drafting cross-hatching conventions for symbolizing the collaterally-produced primary colors red, blue, and green) represent those parts of the respective signals which are effective to cause low-resistance conductive paths, or an "On" gate switching state, to exist between the opposite diagonals of the gating unit (such as from coupling 57 to output coupling 60, through the diodes, in gating unit 42*b*). As shown, the cross-hatched "On" portions of the successive signals are each substantially 120° (considered in relation to the 3.58 mc. frequency), although somewhat different "widths" or durations of the "On" states may be readily developed by setting the D.C. signal levels 64*a*–66*a* differently, or by producing signals 64–65 which are of different amplitudes. The gating operation will be understood when it is recognized that the diodes 59*a*–59*d* will all conduct only when the instantaneous potential applied via coupling 47 exceeds (neglecting small voltage drops) the D.C. potential existing at coupling 61; once the diode conductive state is produced, they offer little resistance to passage of the "gated" portions of the adjusted composite video signal to the output coupling 60, while, at the same time, the currents flowing between couplings 47 and 61 remain essentially isolated and do not materially distort the desired "gated" signals.

The fragment of a composite video signal 67 which is portrayed in FIGURE 5 characterizes a substantially saturated primary-color transmission, specifically transmission representing the color red, during an extremely brief interval (just slightly in excess of the time involved in representing one dot or spot of an overall color-television image). Times $t_1$–$t_4$, which lie along the abscissas in FIGURES 4 and 5, are the same, and it will thus be perceived that the switching "On" of diode gate 42*b* from time $t_1$ to time $t_2$ will result in passage of only that portion of the signal 67 which is cross-hatched in the red (R) convention. The reference level X may be zero or some other level of voltage at which the gate will pass the designated R portion of the signal. Gate 42*b* will not pass any of the B or G portions of the signal 67, however, inasmuch as it is gated to the "Off" condition by gating waveform 64 from time $t_2$ to time $t_4$. Corresponding effects are realized in decoder circuits 43 and 44 for signals characterizing saturated blue and green, respectively, when adjusted composite video signals like signal 67, but shifted about 120° and 240° respectively, are applied to the three decoder circuits. In FIGURE 6, a like composite video signal, 67*a*, is shown to be applied over coupling 67*b* to three decoder channels 68–70, which are similar to decoder circuits 42–44, respectively, in FIGURE 1, and which include gates 68*a*–70*a* to which are applied signals of phases $\phi_1$–$\phi_3$ corresponding to signals 64*a*–66*a* in FIGURE 4. High frequency peaking of the 3.58 mc. chrominance component relative to the lower-frequency luminance component occurs in the peaking circuits 68*b*–70*b* before the gating takes place. Under the existing phasing conditions, and for a chrominance signal 67*a* characterizing a substantially saturated red transmission, a positive plus R, corresponding to the part of the signal occurring between times $t_1$ and $t_2$, appears in the output of gate 68*a*. Upon low-pass filtering or equivalent averaging in circuit 68*c*, the red channel output 68*d* is at a desired level which will control the grid of an associated picture tube (not shown in this figure) to produce a desired red emission. The unwanted portions of the red-characterizing signal 67*a* appearing between times $t_2$ and $t_3$ and times $t_3$ and $t_4$ are not prevented from passing through the blue and green channel gates 69*a* and 70*a*, respectively, during their "On" periods, and these produce the illustrated discontinuous B and G signals. It will be noted that these B and G waveforms include both positive and negative portions, and, after averaging in circuits 69*c* and 70*c*, respectively, they are reduced to substantially zero-level, or very low level, signals 69*d* and 70*d*, respectively. The waveforms R, B and G are repeated in sequence, of course, for repeated cyclings of the composite video waveform 67*a*. Composite video characterizing substantially saturated blue will result in outputs from gate 69*a* and averaging circuit 69*c* which are generally like illustrated waveforms R and 68*d*, while the green channel 70 produces waveforms generally like the illustrated B and 69*c* and the red channel produces waveforms generally like the illustrated G and 70*d*. And, similarly, composite video characterizing substantially saturated green will result in outputs from gate 70*a* and averaging circuit 70*c* which are generally like illustrated waveforms R and 68*d*, while the red channel 68 produces waveforms generally like the illustrated B and 69*c* and the green channel produces waveforms generally like the illustrated G and 70*d*. Although the extreme cases for saturated primary-color decoding have been discussed in detail, it will be evident that much of the time in normal transmissions there are two or three channel outputs, simultaneously, to characterize unsaturated mixtures of colors at various points on the picture tube screen. The waveforms involved can be envisioned in view of what has been specifically described and illustrated for the saturated-color cases, and it should be evident that at least two and often three of the channel gate outputs then do not average out to zero or the aforesaid low level.

For the different color conditions which are to be represented at any instant, not only does the 3.58 mc. component of the composite video have a predetermined phase and amplitude, but this is also superimposed upon (i.e., adds to and subtracts from) a predetermined different level of luminance-characterizing signal, as represented for the primaries in FIGURE 3A. The decoder channel outputs can each be fully and independently adjusted to realize the proper amplitudes and ratios of amplitudes of the 3.5 mc. and luminance components, via the aforesaid saturation, brightness and contrast control units, and the hue is likewise controllable, preferably by regulating the gating reference signal such as that appearing in the FIGURE 1 coupling 61 from the associated voltage-tapped D.C. source, or alternatively, by adjusting one or more of the phases $\phi_1$–$\phi_3$ from phase shifters such as 50–52. In a preferred practice, the three brightness control units, such as unit 42*c* are first each set to just eliminate any visible outputs from the picture tube, as by just causing a raster developed from the output of each decoding channel to vanish from the screen, while the receiver is operating in the absence of any applied composite video signal. Thereafter, one primary color bar signal, such as a red bar from a color bar generator, is supplied to all the decoding channels simultaneously, and the other two (green and blue) channels are each adjusted by way of their saturation controls (corresponding to the illustrated tapped resistance 55 in FIGURE 1) until their respective colors (green and blue) just disappear. The same technique is then applied in relation to another channel, with the first channel saturation control being set to cause its associated color to just disappear from the screen while a color bar signal appropriate for the said other channel is applied (i.e., in the given example, a green bar signal is applied to all decoder channels and the red-channel saturation control tap 55*a* is then set to just eliminate any red output from the screen). No further color setting should be required in the remaining third decoder channel. These saturation controls insure that the unwanted gate outputs are reduced to below the levels at which they can cause spurious colors to be developed, as has been discussed hereinabove. The contrast control units, such as unit 42*d* in FIGURE 1, affect both the luminance- and chrominance-frequency components of the applied composite video, and may be set as final manufacturing adjustments to insure that all decoder channel outputs are proper for the desired luminance characteristics of the resulting pictures. The usual inherent errors in color television reproductions include those caused (a) by the red-, green-, and blue-characterizing subcarrier-frequency vectors failing to lie exactly 120° apart (hue error), (b) by the red-, green-, and blue-characterizing subcarrier-frequency vectors failing to be of equal amplitudes (saturation error), and (c) by the failure of the primary-characterizing signals to have equal luminance characteristics (luminance error). However, the aforesaid decoder-channel settings permit these errors to be overcome, respectively (a) by setting the gating intervals, to compensate for hue error, (b) by setting the relative high frequency gains, to compensate for saturation errors, and (c) by setting the contrast controls, to compensate for luminance errors.

In FIGURE 4, a repetitive sequence (at the 3.58 mc. repetition rate) of pulse outputs from the red (R), blue (B), and green (G) gates in the three decoder channels is symbolized by square-wave pulses labelled R, B and G, respectively. Usually, the discrete gate outputs will be found to be of complex waveform configurations, reflecting the fact that in each decoder channel substantially sinusoidal 3.58 mc. chrominance signals superimposed on various low-frequency and/or D.C. signals are being uniquely gated for about one-third cycle at different relative phasings as the transmitted chrominance signal shifts in phase and changes in amplitude; for purposes of simplification in the drawings, however, these discrete outputs are symbolized by rectangular pulses which each represent the average value of a complex-shaped gated output (in FIGURES 7–10). When the successive gatings occur in equal increments of time, representing substantially a 120° displacement of gating periods, the gate outputs are interleaved substantially as shown in FIGURE 7. Different-width gating periods $R_t$, $B_t$, and $G_t$ (FIGURE 8) are readily achieved by adjustment of the reference D.C. signals applied to the gates (such as the D.C. signal applied to gate 42*b* through coupling 61, in FIGURE 1). As shown in FIGURE 9, for example, all these gating periods may be easily shortened to less than a third of the total repetition period, by employing a level of reference or bias D.C. signal 71 for the gates which will reduce the cross-hatched "On" gating intervals 72–74 for the 3.58 mc., gating signals $\phi_1$–$\phi_3$ to less than one third of the repetition period $t_1$–$t_4$. Trains of independent gated output pulses R, B and G from three decoder channels are portrayed in FIGURE 10, where they are not interleaved; average values 75–77 therefor are characterized in dashed lineword and represent the decoded continuous-wave signals which express the red, blue and green color information after low-pass filtering or other averaging. The latter continuous-wave signals may be applied to picture tube grids controlling the red, blue and green emissions, respectively. It should be evident that the improved decoder circuitry advantageously offers color-characterizing outputs of different types, such as separate or interleaved trains of output pulses, or continuous-wave averaged signals, and can thus be applied in excitation of picture tubes having different color-control signal requirements, such as the shadow-mask and Chromatron or velocity-modulated type tubes. Moreover, the decoding may be performed for less or more than three colors, and/or for colors which are not the classical primaries.

As has been noted earlier herein, the various settings of saturation, hue, brightness and contrast for each color-decoding channel are preferably made as manufacturing adjustments, because of the critical sequencing (channel brightnesses before high-frequency to low-frequency gain), and because of the desirability of utilizing a color bar generator, and because of the cost and complexity of numerous manually-operable controls. In the latter connection, prefabricated decoder circuit modules, such as those having inexpensive tool-adjusted components of approximately the desired values, are preferably employed in manufacture. Nevertheless, it can be desirable that some simple and economical provisions for adjustability by the operator be afforded, also, and the system of FIGURE 11 is of that character. There, the picture tube 78 is color-controlled by the three decoder circuits 79–81, each including at least a"saturation" unit (such as unit 42*a*) which regulates high-frequency to low-frequency gain and further including a different one of three gates (such as 42*b*) slaved with one of the three subcarrier-frequency getting signals $\phi_1$–$\phi_3$ from a combination oscillator and phase-shift network 82. The latter corresponds to the combination of oscillator 46 and phase-adjusters 50–52 in FIGURE 1. Receiver circuitry 83 receives and demodulates transmissions and provides the usual excitations for the picture tube (details not shown); its output of a demodulated composite video signal in coupling 84 is not applied directly to the three decoder circuits 79–81, however, but is, instead, first subject to modification by the operator-accessible control units 85–87, the adjustabilities being symbolized by knobs 88-90, respectively, ganged with the three tapped resistances 91–93. Units 85–87 are like the contrast, saturation and brightness control units 42*d*, 42*a* and 42*c*, respectively, in FIGURE 1 and are effective to regulate the same functions (i.e., contrast, high-frequency to low-frequency gain, and brightness). Inasmuch as the units 85–87 influence the composite video signal before it reaches all of the pre-set decoder circuits 79–81, their effects are witnessed by all of these circuits and by the reproduced color picture as whole. Specifically, the gain adjustment afforded by variable resistance 91 establishes luminance control, and that afforded by variable D.C. voltage-tapping resistance 93 establishes brightness control for the entire picture. Capacitance 94 passes the high-frequency components of the composite video signal while the low-frequency luminance components are variably attenuated by way of resistance 92, such that over-all saturation control is attained. In connection with these control units, it should be borne in mind that the subsequent unique decodings in circuits 79–81 are of course of critical importance in establishing that the desired adjustments will actually be effected along the lines already explained herein. With circuits wherein the decoder outputs are not tied together, contrast and/or brightness controls may instead be included on the output (vs. the input) sides of each of the decoder circuits, as by feeding each of the decoder circuit output signals across a variable attenuating impedance (resistance), for contrast control, and by adding a D.C. signal, for brightness control.

It is important, in some instances, that the decoded primary color signals lie substantially 120° apart (in relation to the 3.58 mc. subcarrier frequency), rather than at other somewhat different characteristic angles expressed in NTSC signals, for example. For such purposes, the necessary compensations to effect the decoding at the optimum times may be made simply by altering the phase-shifts of phase adjusters 50–52 (FIGURE 1) such that respective gatings controlled by their outputs will occur as desired. The phases $\phi_1$–$\phi_3$ (FIGURE 1) are then not precisely 120° displaced, of course, even though the resulting gating actions tend to be so related. Overlap of pulse outputs from the various decoder channels may be suppressed by appropriately biasing the gates such that they conduct at different times only. Alternatively, or in conjunction with the settings of phases $\phi_1$–$\phi_3$ for these same purposes, compensatory phase shifts of one or more of the composite video signals may be made in the decoding channels where such shifts are required; these phase shifts may be effected by an added simple phase-shift network of conventional design appropriately placed in circuit in advance of the gate in each such channel, or in whole or in part by the compensating phase shifts designed into each high-frequency peaking saturation control unit (such as unit 42*b*). In the latter connection, the values of capacitances used in these peaking units are not otherwise highly critical, except that they should pass the 3.58 mc. components significantly more freely than the relatively low-frequency luminance components, and they may thus be selected in relation to associated impedances (such as resistances) to inherently produce certain phase shifts in accordance with known design techniques. The 120° phase relationships of the decoded primaries also advantageously suppresses their tendencies to exhibit an unwanted 3.58 mc. component, which can be particularly troublesome by resulting in color in certain systems at times when the reproduced elemental areas of a televised scene should be white. Specifically, an instance where such phase compensations are highly desirable is in the case of a velocity-modulated picture tube having a multi-layer screen of different phosphors and a single electron gun with a control grid excited by the interleaves pulse outputs from three of the improved decoder channels. Delay lines and tuned circuits such as are involved in conventionally-matrixed receiver circuits are not required in the improved television receivers.

Although specific practices of this invention have been described, and particular embodiments have been illustrated and referred to in the descriptions, it should be understood that various modifications, additions and substitutions may be effected by those skilled in the art without departure from these teachings, and it is aimed in the appended claims to embrace all such variations as fall within the true spirit and scope of this invention.

What I claim as new and desire to secure by Letters Patent of the United States is:

1. Color television receiver apparatus comprising means for deriving from a transmitted television signal a composite video signal including a relatively low-frequency component the magnitudes of which characterize luminance and a relatively high-frequency component the phases and amplitudes of which characterize chromaticity and color saturation, respectively, of a televised image, a plurality of decoder channels each including a peaking circuit regulating the amplitude of said high-frequency component in relation to said low-frequency component and a gating circuit responsive to gating signals for conducting therethrough the output from said peaking circuit during relatively short spaced intervals having a periodicity related to the frequency of said high-frequency component, biasing means for superimposing a DC bias level on the output of each peaking circuit before such output is conducted through the corresponding gating circuit, means producing a plurality of said gating signals each having a different phase in relation to the high-frequency component of said output from said peaking circuit in a different one of said channels, means applying different ones of said gating signals to different ones of said gating circuits to control the conductions thereof, means applying said composite video signal to said peaking circuits, color television image reproducing means including electrode means for regulating colors produced thereby responsive to control signals applied thereto, and means applying to said electrode means as control signals therefor electrical signals related to the peaking circuit outputs conducted through the gating circuits of said decoder channels.

2. Color television receiver apparatus as set forth in claim 1 wherein the periodicity of said gating signals is substantially that of the chrominance subcarrier frequency of the television signal, wherein said gating signals are in predetermined phase relationships with color burst signals included in the television signal, and wherein the peaking circuits in different ones of said decoder channels produce different relative amplitudes of said high-frequency component to said low-frequency component which are related to substantially optimum saturations for different colors characterized by said composite video signal.

3. Color television receiver apparatus as set forth in claim 2 wherein said intervals are less than about one-third the period for each cycle of the chrominance subcarrier frequency, and wherein said gating signals are substantially sinusoidal and are of said subcarrier frequency and are displaced in phase relative to one another.

4. Color television receiver apparatus as set forth in claim 3 wherein said means producing said gating signals comprises an oscillator slaved in phase with the color burst signals and phase-shift means responsive to the output of said oscillator producing three of said gating signals therefrom with substantially 120° phase displacements therebetween, wherein said decoder channels are three in number, and wherein each of said gating circuits includes diodes and biasing means rendering said diodes conductive only when said gating signals applied thereto exceed predetermined signal levels.

5. Color television receiver apparatus as set forth in claim 2 wherein said biasing means comprises in each of said decoder channels a different brightness control means for superimposing selectively variable DC bias upon the output signal of the peaking circuit.

6. Color television receiver apparatus as set forth in claim 2 wherein each of said decoder channels further includes different contrast control impedance means attenuating both said low-frequency and high-frequency components of said composite video signals in the same decoder channel substantially proportionately.

7. Color television receiver apparatus as set forth in claim 2 wherein said means applying signals to said electrode means further includes means averaging the outputs from each of said gating circuits.

8. Color television receiver apparatus as set forth in claim 7 wherein said averaging means includes low-pass filter circuitry modifying the outputs from each of said gating circuits.

9. Apparatus for decoding color control signals set forth in claim 1 wherein the periodicity of said gating signals is substantially that of said high-frequency component, wherein said gating signals are in predetermined phase relationships with color burst signals included in the television signal, and wherein the peaking circuits in different ones of said decoder channels produce different relative amplitudes of said high-frequency component to said low-frequency component which are related to substantially optimum saturations for different colors characterized by said composite video signal.

10. Color television receiver apparatus comprising means deriving from a transmitted television signal a demodulated composite video signal including a first relatively low-frequency component the magnitudes of which characterize luminance and a second relatively high subcarrier-frequency component the phases and amplitudes of which characterize hue and color saturation, respectively, of a televised image, at least two decoder channels each including independent means regulating the amplitude of said second component in relation to said first component and independent gating means conducting the output from said regulating means therethrough during relatively short spaced intervals which are in a predetermined relationship with the times at which a predetermined different hue is characterized by the phase of said subcarrier-frequency component, said regulating means in each of said channels producing a different output in which the ratio of amplitudes of said components is related to substantially optimum saturation for a different hue characterized by said composite video signal, biasing means for superimposing a DC bias level on the output of each regulating means before such output is conducted through the corresponding gating means, said gating means in each of said decoder channels each including a circuit blocking said output and means for rendering said circuit conductive when reference gating signals having predetermined characteristics are applied to said gating means, means synchronized with the color burst signals in the television signal producing said gating signals, means applying said gating signals to each of said gating means with a different phase relationship to the subcarrier-frequency component of said output in the different ones of said channels, means applying said demodulated composite video signal to each of said regulating means, a color television picture tube including control electrode means for controlling the colors produced thereby responsive to control signals applied thereto, and means applying to said control electrode means as control signals therefor electrical signals related to averaged values of said outputs of said regulating means conducted through said gating means of said decoder channels.

11. Color television receiver apparatus as set forth in claim 10 wherein each of said regulating means consists of a combination of resistance and capacitance elements passing said second component of said composite video signal to said gating means in the same channel without substantial attenuation while attenuating said first component by an amount depending upon resistance in said regulating means.

12. Color television receiver apparatus as set forth in claim 11 wherein each of said regulating means includes a resistive potential divider shunted across said means applying said composite video signal and a capacitance serially connected between said gating means in the same channel and said means applying said composite video signal, the potential divider in each of said channels being differently set to produce said different output.

13. Color television receiver apparatus as set forth in claim 11 wherein said biasing means comprises brightness control means including a source of substantially D.C. potential, and means for applying predetermined amount of said potential to said gating means in superimposed relationship to said output from said regulating means in the same channel.

14. Color television receiver apparatus as set forth in claim 13 including three of said decoder channels, wherein said brightness control means includes means for applying a different predetermined amount of said potential to each of the three different gating means, wherein the three regulating means produce different outputs in which said ratio of amplitudes is related to substantially optimum saturation for a different one of red, blue and green hues characterized by said composite video signal, wherein each said circuit blocking said output is normally non-conductive and is unblocked when said gating signals applied to said gating means exceeds a predetermined level, and wherein said reference gating signals and said means for rendering each said non-conductive circuit conductive produce conductive intervals in each of the different gating means which are substantially coincident with times at which a predetermined different one of red, blue and green hues is characterized by the phase of said subcarrier-frequency component therein.

15. Color television receiver apparatus as set forth in claim 11 further comprising contrast control means including resistances differently attenuating both said low-frequency and subcarrier-frequency components of said composite video signals substantially proportionately in different ones of said channels.

16. Color television receiver apparatus as set forth in claim 10 wherein said means applying signals to said control electrode means further includes low-pass filter circuitry averaging the outputs from each of said gating means.

17. Color television receiver apparatus as set forth in claim 10 wherein said reference gating signals are substantially sinusoidal and of the subcarrier frequency and have substantially 120° phase displacements therebetween.

18. Color television receiver apparatus as set forth in claim 17 wherein each of said gating means includes a plurality of interconnected diodes polarized to block conduction in said circuit therethrough and having a second independent circuit therethrough which renders said diodes conductive when said reference gating signals applied thereto exceed said predetermined level.

19. Color television receiver apparatus as set forth in claim 18 wherein each said gating means comprises a four-terminal network of semiconductor devices in which the devices in adjacent legs of the network are oppositely polarized, two diagonally-opposite ones of said terminals providing connections for said non-conductive circuit, means applying one of said gating signals to one of the remaining two diagonally-opposite terminals, and means applying substantially D.C. potential of said predetermined level to the other of the remaining two terminals.

20. Color television receiver apparatus as set forth in claim 10 wherein said means applying signals to said control electrode means includes means independently applying to said electrodes means electrical signals related to different ones of the output signals from said different channels.

21. Color television receiver apparatus as set forth in claim 10 wherein said means applying signals to said control electrode means includes means combining the output signals from said channels and applying to said electrode means electrical signals related to the combined output signals.

22. Color television receiver apparatus as set forth in claim 10 wherein said means applying said composite video signal to each of said regulating means comprises an adjustable peaking circuit for regulating the ratio of amplitudes of said components of said composite video signals whereby to effect saturation adjustments of the reproduced television image.

23. Color television receiver apparatus as set forth in claim 10 wherein said means applying said composite video signal to each of said regulating means comprises a source of variable D.C. potential, and means for superimposing said potential upon said composite video signals, whereby to effect brightness adjustments of the reproduced television image.

24. Color television receiver apparatus as set forth in claim 10 wherein said means applying said composite video signal to each of said regulating means comprises adjustable impedance means for modifying the gain of both said low-frequency and subcarrier-frequency components of said composite video signals substantially proportionately, whereby to effect contrast adjustments of the reproduced television image.

25. Apparatus for decoding color control signals from a composite video signal including a relatively low-frequency component the magnitudes of which characterize luminance and a relatively high-frequency component the phases and amplitudes of which characterize chromaticity and color saturation, respectively, of a televised image, comprising a plurality of decoder channels each including a peaking circuit regulating the amplitude of said high-frequency component in relation to said low-frequency component and a gating circuit responsive to gating signals for conducting therethrough the output from said peaking circuit during relatively short spaced intervals having a periodicity related to the frequency of said high-frequency component, biasing means for superimposing a DC bias level on the output of each peaking circuit before such output is conducted through the corresponding gating circuit, means producing a plurality of said gating signals each having a different phase, in relation to the high-frequency component of said output from said peaking circuit in a different one of said channels, means applying different ones of said gating signals to different one of said gating circuits to control the conductions thereof, and means applying said composite video signal to all of said peaking circuits.

26. Apparatus for decording color control signals from a demodulated composite video signal including a first relatively low-frequency component the magnitudes of which characterize luminance and a second relatively high subcarrier-frequency component the phases and amplitudes of which characterize hue and color saturation, respectively, of a televised image, at least two decoder channels each including independent means regulating the amplitude of said second component in relation to said first component and independent gating means conducting the output from said regulating means therethrough during relatively short spaced intervals which are in a predetermined relationship with the times at which a predetermined different hue is characterized by the phase of said subcarrier-frequency component, said regulating means in each of said channels producing a different output in which the ratio of amplitudes of said components is related to substantially optimum saturation for a different hue characterized by said composite video signal, said gating means in each of said decoder channels each including a circuit blocking said output and means for rendering said circuit conductive when reference gating signals having predetermined characteristics are applied to said gating means, biasing means for superimposing a DC bias level on the output of each regulating means before such output is conducted through the corresponding gating means, means synchronized with the color burst signals in the television signal producing said gating signals, means applying said gating signals to each of said gating means with a different phase relationship to the subcarrier-frequency component of said output in the different ones of said channels, and means applying said demodulated composite video signal to each of said regulating means.

27. Apparatus for decoding color control signals as set forth in claim 26 wherein each of said regulating means consists of a combination of resistance and capacitance elements passing said second component of said composite video signal to said gating means in the same channel without substantial attenuation while attenuating said first component by an amount depending upon resistance in said regulating means.

28. Apparatus for decoding color control signals as set forth in claim 27 wherein each of said regulating means includes a resistive potential divider shunted across said means applying said composite video signal and a capacitance serially connected between said gating means in the same channel and said means applying said composite video signal, the potential divider in each of said channels being differently set to produce said different output.

29. Apparatus for decoding color control signals as set forth in claim 27 wherein said biasing means comprises brightness control means including a source of substantially D.C. potential, and means for applying predetermined amount of said potential to said gating means in superimposed relationship to said output from said regulating means in the same channel.

30. Apparatus for decoding color control signals as set forth in claim 29 including three of said decoder channels, wherein said brightness control means includes means for applying a different predetermined amount of said potential to each of the three different gating means, wherein the three regulating means produce different outputs in which said ratio of amplitudes is related to substantially optimum saturation for a different one of red, blue and green hues characterized by said composite video signal, wherein each said circuit blocking said output is normally non-conductive and is unblocked when said gating signals applied to said gating means exceeds a predetermined level, and wherein said reference gating signals and said means for rendering each said non-conductive circuit conductive produce conductive intervals in each of the different gating means which are substantially coincident with times at which a predetermined different one of red, blue and green hues is characterized by the phase of said subcarrier-frequency component therein.

31. Apparatus for decoding color control signals as set forth in claim 27 further comprising contrast control means including resistance differently attenuating both said low-frequency and subcarrier -frequency components of said composite video signals substantially proportionately in different ones of said channels.

32. Apparatus for decoding color control signals as set forth in claim 26 wherein said means applying signals to said control electrode means further includes low-pass filter circuitry averaging the outputs from each of said gating means.

33. Apparatus for decoding color control signals as set forth in claim 26 wherein said reference gating signals are substantially sinusoidal and of the subcarrier frequency and have substantially 120° phase displacements therebetween.

34. Apparatus for decoding color control signals as set forth in claim 33 wherein each of said gating means includes a plurality of interconnected diodes polarized to block conduction in said circuit therethrough and having a second independent circuit therethrough which renders said diodes conductive when said reference gating signals applied thereto exceed said predetermined level.

35. The method of decoding from demodulated composite video color-television signals color control signals for exciting color image reproducing means, which comprises simultaneously differently modifying the ratio of amplitude of the subcarrier-frequency component of the composite video signal to the luminance-frequency component thereof to produce a plurality of modified signals in each of which the modified ratio represents substantially optimum saturation for a different hue characterized by phase of the subcarrier-frequency component of said composite video signals, superimposing a DC bias level on each of said modified signals, and separately gating the different modified signals with their modified ratios of components during different relatively short spaced intervals which are each in a different predetermined relationship with the different times at which said different ones of the hues are characterized by phase of the subcarrier-frequency component, whereby the gated signals are of optimum values for exciting the emissions of different hues by a color image reproducing means.

36. The method of decoding as set forth in claim 35 wherein the DC level superimposed upon each of the modified signals is independently selected to regulate brightness-inducing qualities of the color control signals.

37. The method of decoding as set forth in claim 36 further comprising differently adjusting the gains of said components of said composite video signals by substantially proportionate predetermined amounts and then differently modifying the ratios of said components of the different composite video signals having the differently-adjusted gains, to regulate contrast-inducing qualities of the color control signals.

38. The method of decoding as set forth in claim 36 further comprising the step of averaging the gated signals.

39. The method of exciting a color television picture tube with control signals derived from demodulated composite video signals, which comprises simultaneously differently modifying the ratio of amplitude of the subcarrier-frequency component of the composite video signals to the luminance-frequency component thereof to produce a plurality of modified signals each representing substantially optimum saturation for a different hue characterized by phase of the subcarrier-frequency component of said composite video signals, superimposing a DC bias level on each of said modified signals, separately gating the modified signals during different relatively short spaced intervals which are each in a different predetermined relationship with the different times at which said respective hues are characterized by phase of the subcarrier-frequency component, and applying the gated signals to a color-television picture tube as color-control signals therefor.

40. The method of exciting a color television picture tube as set forth in claim 39, wherein said plurality of modified signals each represent substantially optimum saturation for a different one of red, blue and green primary hues, respectively, and further comprising the steps of first adjusting the values of the superimposed D.C. signals to just eliminate any visible raster produced on the picture tube by the color-control signals, then setting the ratio of the components in two of the modified signals while applying as excitation a color bar signal represeting a predetermined hue for the third modified signal to just eliminate any visible reproduction of the other two hues on the picture tube, and then setting the ratio of the components in the third modified signal while applying as excitation said color bar signal representing one of the said two hues to just eliminate any visible reproduction of the said predetermined hue on the picture tube.

References Cited

UNITED STATES PATENTS

| | | | |
|---|---|---|---|
| 2,792,522 | 5/1957 | Welch. | |
| 2,863,937 | 12/1958 | Kalfaian. | |
| 2,960,562 | 11/1960 | Macovski. | |
| 2,967,210 | 1/1961 | Kell. | |
| 2,976,351 | 3/1961 | Loughlin | 178—5.4 |
| 2,983,783 | 5/1961 | Pritchard et al. | 178—5.4 |
| 3,207,945 | 9/1965 | Goodman. | |

RICHARD MURRAY, Primary Examiner

U.S. Cl. X.R.

329—50